(12) United States Patent
Clute

(10) Patent No.: US 7,318,560 B2
(45) Date of Patent: Jan. 15, 2008

(54) SWITCHABLE LOAD LIMITING SEATBELT RETRACTOR

(75) Inventor: Gunter Clute, Bloomfield Hills, MI (US)

(73) Assignee: Autoliv ASP, Inc., Ogden, UT (US)

( * ) Notice: Subject to any disclaimer, the term of this patent is extended or adjusted under 35 U.S.C. 154(b) by 365 days.

(21) Appl. No.: 11/008,418

(22) Filed: Dec. 9, 2004

(65) Prior Publication Data

US 2006/0124795 A1   Jun. 15, 2006

(51) Int. Cl.
    *B60R 22/28* (2006.01)
(52) U.S. Cl. ............ 242/379.1; 280/805; 297/470
(58) Field of Classification Search ............ 242/379.1; 297/470, 471; 280/805
    See application file for complete search history.

(56) References Cited

U.S. PATENT DOCUMENTS

| | | | |
|---|---|---|---|
| 5,522,564 A | 6/1996 | Schmidt et al. | |
| 5,547,143 A | 8/1996 | Miller, III et al. | |
| 5,820,058 A * | 10/1998 | Hirzel et al. | 242/379.1 |
| 5,938,135 A | 8/1999 | Sasaki et al. | |
| 6,012,667 A * | 1/2000 | Clancy et al. | 242/379.1 |
| 6,029,924 A * | 2/2000 | Ono et al. | 242/379.1 |
| 6,105,893 A | 8/2000 | Schmidt et al. | |
| 6,105,894 A | 8/2000 | Singer et al. | |
| 6,241,172 B1 * | 6/2001 | Fugel et al. | 242/379.1 |
| 6,267,314 B1 | 7/2001 | Singer et al. | |
| 6,360,980 B1 * | 3/2002 | Lee | 242/379.1 |
| 6,364,238 B1 | 4/2002 | Weller | |
| 6,616,081 B1 | 9/2003 | Clute et al. | |
| 6,729,649 B1 | 5/2004 | Schmidt | |
| 2001/0006204 A1 * | 7/2001 | Kajiyama | 242/379.1 |

FOREIGN PATENT DOCUMENTS

| | | |
|---|---|---|
| EP | 0 627 345 B1 | 4/1994 |
| EP | 0 627 345 A1 | 12/1994 |
| EP | 0 856 443 A1 | 8/1998 |
| EP | 1 405 777 A1 | 4/2004 |

\* cited by examiner

*Primary Examiner*—Peter M. Cuomo
*Assistant Examiner*—Stefan Kruer
(74) *Attorney, Agent, or Firm*—Sally J Brown; Brinks Hofer Glison & Lione

(57) ABSTRACT

A seatbelt retractor is disclosed having a frame, a spindle, a tread head and a torsion bar. The frame is attached to a structure of a vehicle. The spindle is rotatably supported by the frame. The tread head is matingly coupled to the spindle for relative rotational movement therewith and the tread head is rotationally fixable relative to the frame. The torsion bar has a torsion bar first end fixed to a first spindle end and a torsion bar second end fixed to the tread head and the torsion bar has a protrusion that selectively engages the spindle after the tread head has been fixed and the spindle has rotated a predefined angle α relative to the fixed tread head.

22 Claims, 2 Drawing Sheets

SWITCHABLE LOAD LIMITING SEATBELT RETRACTOR

TECHNICAL FIELD

The present invention relates to seatbelt retractors and to seatbelt retractors having load limiters that control forces exerted by the seatbelt on a vehicle occupant.

BACKGROUND

All vehicles sold today, especially throughout the United States, must have occupant safety systems. Such systems include, for example, seatbelts and airbags. Much advancement has been made and continues to be made to improve the performance of the seatbelt and airbag systems. For example, much effort is being spent on studying the interaction of the seatbelt and airbag restraint systems on a vehicle occupant. Both systems exert restraining forces on a vehicle occupant's body during a collision. These restraining forces must be properly controlled in order to obtain the desired occupant protection. For example, with regard to the airbag system the pressure and forces exerted by the airbag on the vehicle occupant has been modified in the recent generation airbag systems to enhance occupant protection by matching the restraining force required to properly restrain the occupant during a vehicle collision to the particular occupant characteristics (size, weight, etc.) and the severity of the collision. Recent seatbelt systems have incorporated devices to further enhance the performance of the seatbelt restraint device. For example, many seatbelts today incorporate pretensioners which take up slack in a seatbelt the moment a vehicle collision is detected. The pretensioner and seatbelt retractor combination prevents unrestrained movement of the vehicle occupant during a vehicle collision. Other enhancements in seatbelts include "load limiters" which are incorporated into seatbelt retractors. The function of the load limiter is to pay out a predetermined length of seatbelt webbing in order to eliminate or reduce peak loads on a vehicle occupant. A load limiter is, for example, a torsion bar that is coupled to the spindle of the retractor and is configured to twist when a predetermined amount of torque is applied to an end of the torsion bar. As torque is applied to the torsion bar, the torsion bar twists and the spindle rotates a corresponding amount paying out the seatbelt webbing.

More recent enhancements in load limiters have been directed to addressing the differences in restraining forces required to safely bring occupants of different sizes to rest. For example, higher restraining forces will be applied to a larger vehicle occupant as opposed to a smaller vehicle occupant. Thus, the load limiting characteristics of torsion bars or other load limiting devices must be configured to accommodate different sized occupants. To this end, multi-stage load limiting devices have been developed. A multi-stage torsion bar, for example, is such a device. The multi-stage torsion bar is essentially two torsion bars that are axially aligned and joined at respective ends. The appropriate stage or portion of the torsion bar may be selectively oriented to provide the appropriate load limiting characteristics necessary to address the different sized occupants.

While these enhancements in safety restraints have achieved their intended purpose, further enhancements are needed to ensure appropriate occupant restraint is provided in the most cost effective and efficient manner.

SUMMARY

In an aspect of the present invention, a seatbelt retractor is provided having a frame, a spindle, a tread head and a torsion bar. The frame is attached to a structure of a vehicle. The spindle is rotatably supported by the frame. The tread head is matingly coupled to the spindle for relative rotational movement therewith and the tread head is rotationally fixable relative to the frame. The torsion bar has a torsion bar first end fixed to a first spindle end and a torsion bar second end fixed to the tread head and the torsion bar has a protrusion that selectively engages the spindle after the tread head has been fixed and the spindle has rotated a predefined angle α relative to the fixed tread head.

In another aspect of the present invention the protrusion is integrally formed in the torsion bar.

In yet another aspect of the present invention the seatbelt retractor includes a slot disposed in the spindle for receiving the protrusion.

In yet another aspect of the present invention the slot has a length that allows the protrusion of the torsion bar to sweep through the predefined angle α.

In yet another aspect of the present invention the protrusion is disposed between the first and second ends of the torsion bar.

In yet another aspect of the present invention the torsion bar includes a first and a second torsion bar portions wherein the first torsion bar portion has a cross-sectional diameter that is larger than a cross-sectional diameter of the second torsion bar portion.

In yet another aspect of the present invention the spindle has a spindle stop feature that engages the protrusion of the torsion bar.

In yet another aspect of the present invention the spindle stop feature is fixed to the spindle and selectively engages the protrusion of the torsion bar.

In yet another aspect of the present invention the spindle stop feature moves relative to the spindle to engage and disengage the protrusion of the torsion bar.

In yet another aspect of the present invention the first bar portion has a length that is greater than a length of a second bar portion.

In still another aspect of the present invention the first bar portion as an end having a square cross-section.

In still another aspect of the present invention the first bar portion has an end having a rectangular cross-section.

In still another aspect of the present invention the first bar portion has a non-circular cross-section.

In still another aspect of the present invention the first bar portion has rectangular cross-section.

These and other aspects and advantages of the present invention will become apparent upon reading the following detailed description of the invention in combination with the accompanying drawings.

DESCRIPTION

Figure 1:
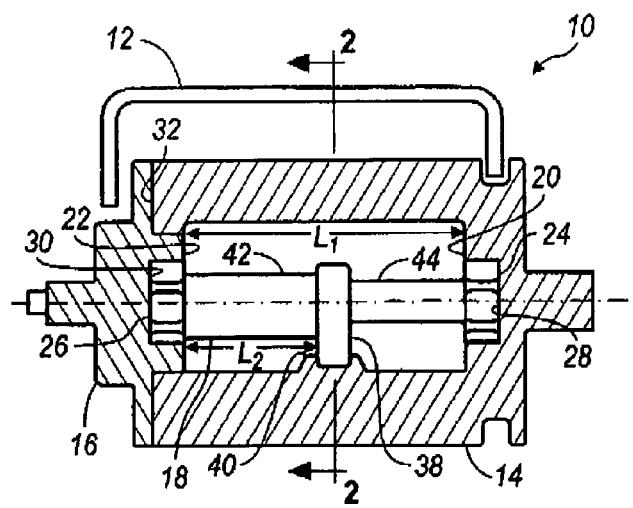
FIG. 1 is a partial cutaway view of a seatbelt retractor including a torsion bar and spindle, in accordance with an embodiment of the present invention.

Referring now to FIG. 1, a cross-sectional view of a seatbelt retractor 10 is illustrated, in accordance with the present invention. Seatbelt retractor 10 may be incorporated into road vehicles for use as an active restraint device. Retractor 10 operates to restrain a vehicle occupant's movement towards the interior of the road vehicle. Seatbelt retractor 10 includes a frame 12, a spindle 14, a tread head 16 and a torsion bar 18. Frame 12 supports spindle 14 and is securely fixed to a vehicle structural member such as a vehicle frame (not shown). Spindle 14 is configured, as known, to retract and protract seatbelt webbing (not shown) that is wound about the spindle. Spindle 14 freely rotates to protract and retract seatbelt webbing during normal operation, however, during a vehicle crash; the spindle is locked to prevent further protraction. In order to lock spindle 14, a tread head 16 is provided having a profile that is engageable, as known to one of ordinary skill in the art. Once tread head 16 is locked, spindle 14 can move or rotate relative to tread head 16. Disposed within spindle 14 and between a first end 20 of spindle 14 and a first tread head end 22, is a torsion bar 18.

Torsion bar 18 includes first and second ends 24, 26 having splines formed therein. Spline end 24 cooperates with a corresponding aperture 28 within spindle 14 to rotationally fix torsion bar 18 with spindle 14. In a similar manner, spline end 26 cooperates with a corresponding aperture 30 disposed within tread head 16 to rotationally fix torsion bar 18 relative to tread head 16. First tread head end 22 has a profile which matingly corresponds with a profile on a second end 32 of spindle 14. The interface (mating surfaces of first tread head end 22 and second spindle end 32) between tread head 16 and spindle 14 allows relative movement between the tread head and spindle. In other words, when tread head 16 is rotationally locked, spindle 14 is allowed to rotate relative to the rotationally fixed tread head.

With continuing reference to FIG. 1, torsion bar 18 is further illustrated, in accordance with an embodiment of the present invention. Torsion bar 18 further includes an intermediate head 38 disposed between spline ends 24 and 26 of torsion bar 18. Intermediate head 38 is configured, as will be further illustrated and described, to interact with a locking or stop feature 40 disposed within spindle 14.

Figure 5:
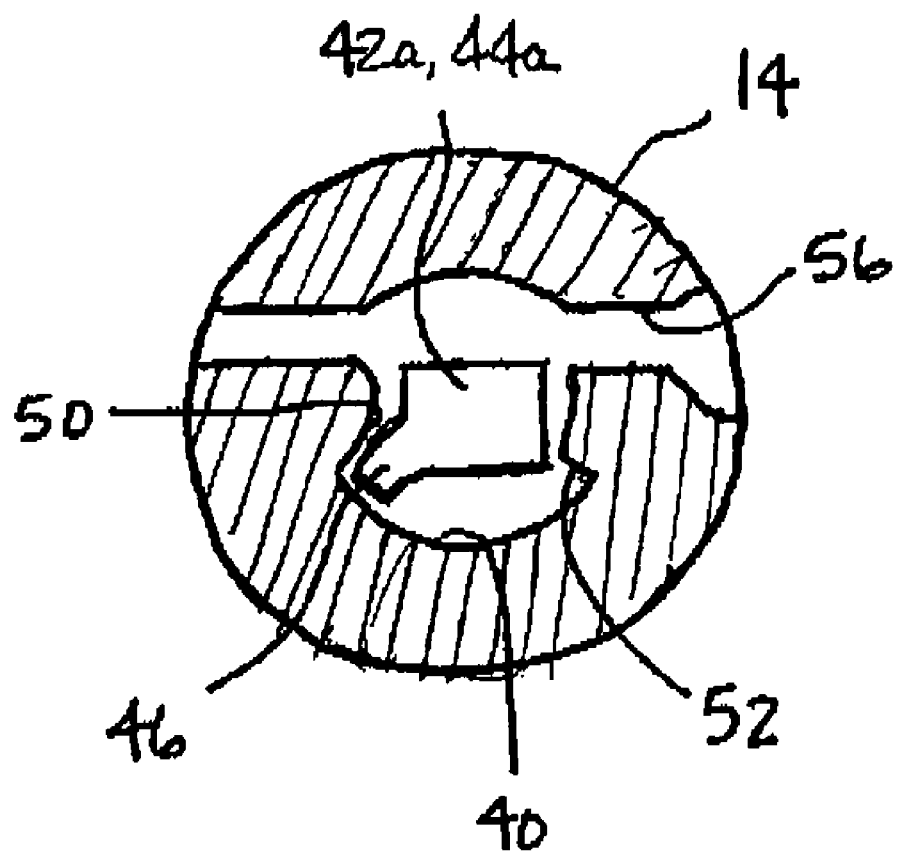
FIG. 5 is cross-sectional view similar to FIG. 2, showing a alternatively shaped torsion bar.

Torsion bar 18 provides "a multi-stage" load limiting feature by providing two distinct torsion bar portions 42 and 44. The two distinct torsion bar portions 42 and 44 provide different load limiting characteristics, as will be described in more detail below. Various configurations of portions 42 and 44 may be provided to achieve the desired load limiting characteristics. For example, as shown, torsion bar 42 portions 42 and 44 may be cylindrical and wherein torsion bar portion 44 has a smaller diameter than torsion bar portion 42. Of course, the present invention contemplates other shapes and configurations of torsion bar portions 42 and 44, for example, portions 42 and 44 may have a square or rectangular cross-section. (see. e.g. bar portions 42a, 44a in FIG. 5).

Figure 2:
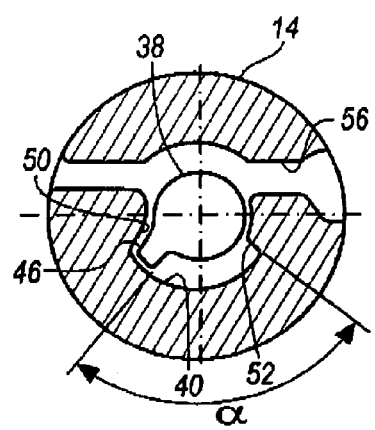
FIG. 2 is a cross-sectional view through the spindle and torsion bar at a position referenced in FIG. 1, in accordance with an embodiment of the present invention.

Referring now to FIG. 2, a cross-sectional view of retractor 10, as indicated in FIG. 1, is illustrated in accordance with an embodiment of the present invention. Moreover, FIG. 2 illustrates the cooperation of intermediate head 38 with the stop feature 40 disposed in spindle 14. Intermediate head 38 includes a spline or protrusion 46. Spline 46 is disposed within stop feature 40 which may be in the form of a slot. Alternatively, the present invention contemplates stop feature 40 being an active stop feature (rather than a fixed stop feature i.e. a slot) that may be actuated to engage torsion bar 18 after a prescribed angular rotation (or twisting) of torsion bar 18. Thus, multiple stop features may be provided as well as stop features that allow different angular rotations of torsion bar 18.

During normal retractor 10 operation where torsion bar 18 is in a relatively untwisted state, spline 46 would be proximate to a first end 50 of stop feature 40. However, during a vehicle collision, spline 46 will be allowed to rotate through a maximum angle $\alpha$ until spine 46 reaches a second end 52 of feature 40. Retractor 10 and torsion bar 18 will operate in a first "load limiting" mode or stage until the angle $\alpha$ is fully traversed by spline 46 and contacts second end 52 of feature 40. While in the first "load limiting" mode, torsion bar portion 44 will twist and the belt load is transferred over the length, L1, of the torsion bar 18. Once spline 46 contacts the second end 52 of feature 40, retractor 10 and torsion bar 18 will enter a second "load limiting" mode or stage of load limiting operation. During the second "load limiting" mode, torsion bar 18 will twist only along a portion of its length L2. In this manner, retractor 10 provides a "multi-stage load limiting" characteristic as will be further described and illustrated below. As further illustrated in FIG. 2, a transverse slot 56 is provided through spindle 14 to allow the seatbelt webbing (not shown) to pass through the spindle in order to secure the seatbelt webbing to spindle 14.

Figure 3:
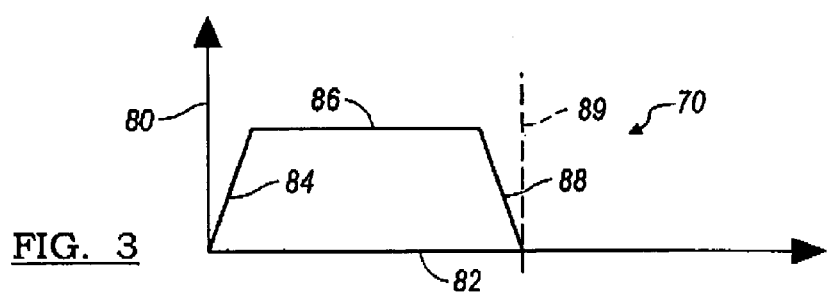
FIG. 3 is a chart illustrating retractor operation in the first load limiting stage and the force applied to the vehicle occupant by the seatbelt webbing versus time duration of the vehicle collision, in accordance with an embodiment of the present invention.
Figure 4:
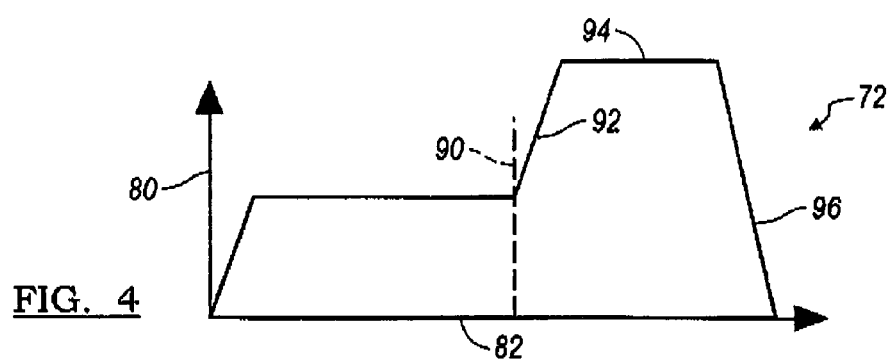
FIG. 4 is a chart illustrating retractor operation in the second load limiting stage and the force applied to the vehicle occupant by the seatbelt webbing versus time duration of the vehicle collision, in accordance with the present invention.

Referring now to FIGS. 3 and 4, charts 70, 72 illustrate loading of the seatbelt webbing versus time duration of a vehicle crash are provided, in accordance with the present invention. More specifically, FIG. 3 illustrates the result of retractor 10 and torsion bar 18 load limiting characteristics during the "first mode or stage" of load limiting operation. On a vertical axis 80, seatbelt webbing loading is plotted against time duration of the vehicle collision on a horizontal axis 82. As illustrated during a vehicle impact, the loading of the webbing by a vehicle occupant will increase from zero to a predefined level, as indicated by segment 84, to a predetermined maximum loading, as defined by segment 86, and then decreased back to zero, as represented by segment 88, when the vehicle occupant comes to rest.

The predetermined maximum loading (as illustrated by segment 86) is defined and controlled by the load limiting characteristics of the torsion bar 18. More specifically, during a vehicle collision the seatbelt webbing will be loaded by the vehicle occupant and start to pay-out as torsion bar 18 starts to twist. As torsion bar 18 continues to twist spline 46 will move through feature 40 towards second end 52 of feature 40. If the vehicle collision is a low severity collision or the vehicle occupant is a small sized occupant, then loading on the seatbelt webbing will return to zero and torsion bar 18 will stop twisting before spline 46 reaches second end 52 of stop feature 40, as represented by dashed line 89.

With now specific reference to FIG. 4, chart 72 is provided illustrating seatbelt webbing pay out during a second "mode or stage" of load limiting operation, in accordance with the present invention. As with FIG. 3, seatbelt webbing loading is plotted on a graph or chart having a vertical axis 80 corresponding to the force applied to the seatbelt webbing and on a horizontal axis 82 corresponding to time duration of a vehicle collision. Depending on the severity of the crash and the occupant size, torsion bar 18 and intermediate head 38 will continue to rotate until spline 46 contacts second end 52 of stop feature 40. Once angle α is traversed by spline 46, retractor 10 enters the second "mode or stage" of load limiting operation. This second stage of operation is designated by reference line 90 in FIG. 4. The additional energy present due to the severity of the crash and/or the occupant size will be absorbed by additional twisting of portion 42 of torsion bar 18 along its length L2. This twisting of portion 42 is designated by segments 92 and 94 in chart 72 of FIG. 4. The twisting of torsion bar 18 will continue providing a constant loading of the seatbelt webbing, as represented by segment 94 of FIG. 4. After the energy has been absorbed, loading of the seatbelt will rapidly decrease to zero as designated by segment 96.

As any person skilled in the art of seatbelt retractors will recognize from the previous detailed description and from the figures and claims, modifications and changes can be made to the preferred embodiments of the invention without departing from the scope of this invention defined in the following claims.

I claim:

1. A seatbelt retractor comprising:
   a frame attached to a structure of a vehicle;
   a spindle rotatably supported by the frame;
   a tread head matingly coupled to the spindle for relative rotational movement therewith and wherein the tread head is rotationally fixable; and
   a torsion bar having a torsion bar first end fixed to a first spindle end and a torsion bar second end fixed to the tread head and wherein the torsion bar has a protrusion that selectively engages the spindle after the tread head has been fixed and the spindle has rotated a predefined angle α relative to the fixed tread head.

2. The seatbelt retractor of claim 1 wherein the protrusion is integrally formed In the torsion bar.

3. The seatbelt retractor of claim 1 further comprising a slot disposed in the spindle for receiving the protrusion.

4. The seatbelt retractor of claim 1 wherein the protrusion is disposed between the first and second ends of the torsion bar.

5. The seatbelt retractor of claim 1 wherein the torsion bar includes a first and a second torsion bar portions and wherein the first torsion bar portion has a cross-sectional diameter that is larger than a cross-sectional diameter of the second torsion bar portion.

6. The seatbelt retractor of claim 1 further comprising a spindle stop feature that engages the protrusion of the torsion bar.

7. The seatbelt retractor of claim 1 wherein the spindle stop feature moves relative to the spindle to engage and disengage the protrusion of the torsion bar.

8. The seatbelt retractor of claim 1 wherein the torsion bar includes a first and a second torsion bar portions and wherein the first bar portion has a length that is greater than a length of a second bar portion.

9. The seatbelt retractor of claim 1 wherein the torsion bar includes a first and a second torsion bar portions and wherein the first bar portion has an end having a square cross-section.

10. The seatbelt retractor of claim 1 wherein the torsion bar includes a first and a second torsion bar portions and wherein the first bar portion has an end having a rectangular cross-section.

11. The seatbelt retractor of claim 1 wherein the torsion bar includes a first and a second torsion bar portions and wherein the first bar portion has a non-circular crosssection.

12. The seatbelt retractor of claim 1 wherein the spindle and protrusion are sized and structured to automatically engage after the tread head has been fixed and the spindle has rotated a predefined angle α relative to the fixed tread head.

13. The seatbelt retractor of claim 3 wherein the slot has a length that allows the protrusion of the torsion bar to sweep through the predefined angle α.

14. The seatbelt retractor of claim 3 wherein the slot includes first and second ends that selectively engage the protrusion.

15. The seatbelt retractor of claim 6 wherein the spindle stop feature is fixed to the spindle and selectively engages the protrusion of the torsion bar.

16. The seatbelt retractor of claim 11 wherein the first bar portion has a rectangular cross-section.

17. A seatbelt retractor comprising:
   a frame attached to a structure of a vehicle;
   a spindle rotatably supported by the frame;
   a tread head matingly coupled to the spindle for relative rotational movement therewith and wherein the tread head is rotationally fixable; and
   a torsion bar having a torsion bar first end fixed to a first spindle end and a torsion bar second end fixed to the tread head and wherein the torsion bar has a protrusion that is disposed in a slot in the spindle, wherein the protrusion selectively engages an end of the slot after the tread head has been rotationally fixed and spindle has rotated a predefined angle α relative to the fixed tread head.

18. The seatbelt retractor of claim 17 wherein the protrusion is integrally formed in the torsion bar.

19. The seatbelt retractor of claim 17 wherein the slot has a length that allows the protrusion of the torsion bar to sweep through the predefined angle α.

20. The seatbelt retractor of claim 17 wherein the protrusion is disposed between the first and second ends of the torsion bar.

21. The seatbelt refractor of claim 17 wherein the torsion bar includes a first and a second torsion bar portions wherein the first torsion bar portion has a cross-sectional diameter that is larger than a cross-sectional diameter of the second torsion bar portion.

22. The seatbelt retractor of claim 21 wherein the first bar portion has a length that is greater than a length of a second bar portion.

* * * * *